United States Patent

Okada et al.

[11] 3,853,917
[45] Dec. 10, 1974

[54] PROCESS FOR THE PREPARATION OF D-GLUCAROLACTONE DERIVATIVES

[75] Inventors: Masanori Okada, Niiza; Kiyoshi Okui, Tsuchiura; Hidenori Takahashi, Omiya; Arata Tanoura, Tokyo, all of Japan

[73] Assignee: Chugai Seiyaku Kabushiki Kaisha, Tokyo, Japan

[22] Filed: Dec. 19, 1972

[21] Appl. No.: 316,540

[30] Foreign Application Priority Data
Dec. 28, 1971 Japan............................. 46-105684

[52] U.S. Cl............................... 260/340.7, 424/278
[51] Int. Cl............................................ C07d 15/04
[58] Field of Search.......... 260/340.7, 558 R, 562 R

[56] References Cited
UNITED STATES PATENTS
648,580   5/1900   Behal .............................. 260/562 R
2,390,106  12/1945  Krieble et al. .................. 260/561 R OTHER PUBLICATIONS
Lucas, Organic Chemistry, 2nd Ed., 1953, Amer. Book Co., New York, N.Y. pp. 212, 213, 215, 216.

*Primary Examiner*—Donald G. Daus
*Assistant Examiner*—James H. Turnipseed
*Attorney, Agent, or Firm*—Browdy and Neimark

[57] ABSTRACT

The process for the preparation of the D-glucarolactone derivatives represented by the formula

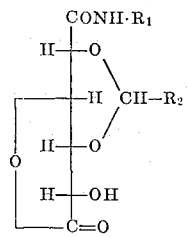

wherein $R_1$ and $R_2$ are as defined hereinafter, which are useful as anti-inflammatory agents as they are and as starting materials for the preparation of useful pharmaceuticals.

5 Claims, No Drawings

PROCESS FOR THE PREPARATION OF D-GLUCAROLACTONE DERIVATIVES

DESCRIPTION OF THE INVENTION

This invention relates to a process for the preparation of D-glucarolactone derivatives. More particularly, this invention relates to a process for the preparation of D-glucarolactone derivatives represented by the formula

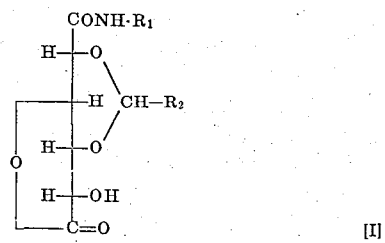

wherein $R_1$ is selected from the group consisting of a lower alkyl group, a lower alkoxyalkyl group, a cycloalkyl group, a lower alkenyl group, a phenyl group which may be substituted with a halogen atom or a lower alkoxy group, and a benzyl group which may be substituted with a halogen atom; $R_2$ represents a phenyl group which may be substituted with a halogen atom, a lower alkyl group or a lower alkoxy group.

With respect to a process for the preparation of a compound analogous to the compound represented by the formula [I], a process for the preparation of 1-amido compound ($R_1$ and $R_2$ in the formula [I] above are phenyl and a hydrogen atom, respectively) has been reported by the inventors of this invention and others in the Yakugaku Zasshi, Vol. 86, p. 1057 (1966). However, in that process, the object compound is given by subjecting a 1,6-diamido compound to the deammoniating reaction in acetic acid with heating, and therefore, the decomposition and the debenzylidenating reaction of the amido group at 1-position is intended to take place. Further, in the process using some organic amides which are expected to have a useful physiological activity as a pharmaceutical such as that of the compound [I], the reaction proceeds with difficulty under the same conditions as above. For these reasons, the process reported is not advantageous.

The object of the present invention is to provide a novel process for the preparation of the compounds represented by the formula [I] above without disadvantages such as those mentioned above.

In accordance with the present invention, the compounds represented by the formula [I] can be prepared by reacting the compound represented by the formula

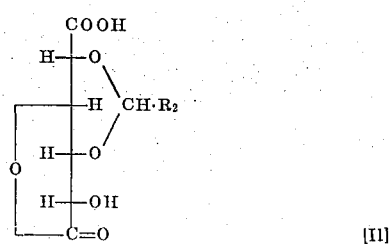

wherein $R_2$ is as defined above, with a halogenoformic acid ester represented by the formula $$XCOOR \qquad [III]$$

wherein R represents a lower alkyl group and X represents a halogen atom, and reacting the resulting compound with an amine represented by the formula $$R_1NH_2 \qquad [IV]$$

wherein $R_1$ is as defined above.

The compound [II] used as a starting material can be produced by the process disclosed in, for example, Journal of the Chemical Society, p 4512 (1964). This material can generally be obtained as a stable crystalline substance, but, in some cases, it may be a gelatinous substance having poor crystallinity. In either case, the compound [II] can be used as a starting material for the process of this invention.

In carrying out the process of this invention, the compound [II] is first dissolved in an appropriate solvent such as dimethylformamide, tetrahydrofuran, chloroform and the like, and the resulting solution is then reacted with the compound [III] in the presence of a condensing agent, for example, tertiary amines such as trimethylamine, triethylamine and the like followed by reaction with the compound [IV]. The overall reaction can be carried out at a temperature below room temperature, but is advantageously effected under cooling at a temperature ranging from $-30°$ to $5°C$. to minimize side reactions and to ensure an improved yield. The reaction between the compound [II] and the compound [III] is considered to result in the production of a mixed anhydride, but the mixed anhydride cannot be isolated because of its poor stability.

The D-glucarolactones of the formula [I] may be converted, although they have anti-inflammatory activity as they are, into 5-O-acyl-2,4-O-benzylidene-D-glucaro-1-amido-6,3-lactones, which exhibit excellent anti-inflammatory activity, by reacting them with a carboxylic acid or a functional derivative thereof represented by the formula $$R_3COOH$$

wherein $R_3$ is selected from the group consisting of a lower alkyl, a carboxy-lower-alkyl group and a phenyl group which may be substituted with a halogen atom. The reaction proceeds merely by mixing the compound of the formula [I] and a carboxylic acid or a functional derivative thereof, but in order to conduct the reaction smoothly and ensure the high yield, it is preferable to carry out the reaction in the presence of an appropriate solvent such as benzene, acetone, chloroform, dimethylformamide, tetrahydrofuran and the like. Also, a condensing agent, for example, acids such as sulfuric acid, p-toluenesulfonic acid and the like, bases such as pyridine, quinoline, triethylamine, an alkali metal carbonate, an alkali metal alcoholate, or salts such as zinc chloride, sodium acetate, etc. can advantageously be used in the reaction. The reaction temperature is not critical, but an increased yield can usually be obtained at a reaction temperature ranging from $0°$ to $60°C$.

The present invention is further illustrated in greater detail by the following examples and experiments but they are not to be construed as limiting the scope of this invention.

EXAMPLE 1

5.6 g of 2,4-O-benzylidene-D-glucaro-6,3-lactone was dissolved in 100 ml of dimethylformamide, and 2.8 ml of triethylamino was then added thereto followed by cooling at −10°C. While stirring at that temperature, 2.0 ml of ethyl chloroformate was added dropwise thereto and the mixture was stirred for an additional 15 minutes. 1.1g of allylamine was then added dropwise to the mixture, and after completion of the addition, the mixture was stirred for one hour at that temperature and for an additional 1 hour at room temperature. The reaction mixture was poured into 500 ml of ice-water, and the precipitated crystals were filtered, washed with water, dried and recrystallized from ethanol to give N-allyl-2,4-O-benzylidene-D-glucaro-1-amido-6,3-lactone as a colorless powder. Yield, 5.1 g; melting point, 180° − 184°C.

Analysis: Calcd. for $C_{16}H_{17}O_6N$:
C, 60.18; H, 5.37; N, 4.39 (%)
Found: C, 59.80; H, 5.34; N, 4.19 (%)

EXAMPLE 2

2.8 g of 2,4-O-benzylidene-D-glucaro-6,3-lactone was dissolved in 50 ml of dimethylformamide, and 1.4 ml of triethylamine was added to the solution followed by cooling at −10°C. While stirring at that temperature, 1.0 ml of ethyl chloroformate was added dropwise thereto, and the mixture was stirred for an additional 15 minutes. 1.0 ml of n-butylamine was added dropwise slowly to the mixture which was then stirred for one hour at that time and for one hour at room temperature. The reaction mixture was poured into 300 ml of ice-water, and the precipitated crystals were filtered, washed with water and dried. Recrystallization from ethanol yielded N-n-butyl-2,4-O-benzylidene-D-glucaro-1-amido-6,3-lactone as a colorless powder. Yield, 2.7 g; melting point, 208° − 209°C.

Analysis: Calcd. for $C_{17}H_{21}O_6N$:
C, 60.88; H, 6.31; N, 4.18 (%)
Found: C, 60.84; H, 6.45; N, 4.37 (%)

EXAMPLE 3

5.0 g of D-glucaro-6,3-lactone was suspended in 10 ml of p-anisaldehyde, and 1.5 g of p-toluenesulfonic acid was added to the suspension followed by stirring at room temperature for about 5 hours whereby crystals were precipitated slowly. After allowing to stand overnight, the crystals were triturated and washed with 100 ml of isopropanol, and filtered. The resulting crystals were washed with 50 ml of water, dried and recrystallized from methanol to give 2,4-O-(p-methoxybenzylidene)-D-glucaro-6,3-lactone as colorless prisms. Yield, 3.2 g; melting point, 179°C.

3.1 g of resulting crystals was dissolved in 50 ml of dimethylformamide, and 1.4 ml of triethylamine was added to the solution followed by cooling to −10°C. To the mixture was added dropwise 1.0 ml of ethyl chloroformate while stirring at that temperature, and the mixture was stirred for an additional 15 minutes. 1.2 ml of cyclohexylamine was then added dropwise and the resulting mixture was stirred at that temperature for one hour followed by stirring at room temperature for 1 hour. The reaction mixture was poured into 300 ml of ice-water, and the precipitated crystals were filtered and washed with water. After drying, the crystals were recrystallized from methanol to give N-cyclohexyl-2,4-O-(p-methoxybenzylidene)-D-glucaro-1-amido-6,3-lactone as colorless needle crystals. Yield, 2.5 g; melting point, 235° − 236°C.

Analysis: Calcd. for $C_{20}H_{25}O_7N$:
C, 61.37; H, 6.44; N, 3.58 (%)
Found: C, 60.98; H, 6.47; N, 3.59 (%)

EXAMPLE 4

4.2 g of 2,4-O-benzylidene-D-glucaro-6,3-lactone was dissolved in 70 ml of dimethylformamide, and 2.1 ml of triethylamine was added thereto followed by cooling at −10°C. While stirring at that temperature, 2.1 g of butyl chloroformate was added dropwise to the mixture followed by stirring for an additional 15 minutes. 1.4 g of analine was added dropwise to the mixture and the stirring was continued at that temperature for 1 hour and at room temperature for 1 hour. The reaction mixture was poured into 500 ml of ice-water, and the precipitated crystals were filtered, washed with water, dried and recrystallized from ethanol to give N-phenyl-2,4-O-benzylidene-D-glucaro-1-amido-6,3-lactone as colorless long needle crystals. Yield, 3.8 g; melting point, 242° − 243°C (decomposition).

Analysis: Calcd. for $C_{19}H_{17}O_6N$:
C, 64.22; H, 4.82; N, 3.94 (%)
Found: C, 64.24; H, 4.61; N, 3.93 (%)

EXAMPLES 5–18

In the same manner as described in Example 1 the compounds shown in Table 1 below were prepared.

Table 1
Elementary Analysis (%)
(experimentally determined value in bracket)
| Example No. | R₁ | Substituent R₂ | Melting Point (°C) | Empirical Formula | C | H | N |
|---|---|---|---|---|---|---|---|
| 5 | $-CH_3$ | H | 238 - 239 | $C_{14}H_{15}O_6N$ | 57.33 (57.65) | 5.16 (5.23) | 4.78 (4.78) |
| 6 | $-CH_2CH_3$ | H | 224 - 225 | $C_{15}H_{17}O_6N$ | 58.63 (59.08) | 5.58 (5.61) | 4.56 (4.59) |
| 7 | $-CH_2CH_2CH_3$ | H | 190 - 192 | $C_{16}H_{19}O_6N$ | 59.80 (59.74) | 5.96 (6.07) | 4.36 (4.29) |
| 8 | $-CH_2(CH_2)_2CH_3$ | p-$OCH_3$ | 202 - 205 | $C_{18}H_{23}O_7N$ | 59.18 (59.20) | 6.33 (6.24) | 3.83 (3.99) |
| 9 | $-CH_2(CH_2)_2CH_3$ | o-$Cl$ | 214 - 215 | $C_{17}H_{20}O_6N$ | 55.22 (55.14) | 5.45 (5.63) | 3.79 (3.81) |
| 10 | $-CH_2(CH_2)_2CH_3$ | 3,4-diethoxy | 221 - 222 | $C_{21}H_{29}O_8N$ | 59.56 (59.59) | 6.90 (6.83) | 3.31 (3.55) |
| 11 | $-CH_2CH\begin{matrix}CH_3\\CH_3\end{matrix}$ | H | 222 - 224 | $C_{17}H_{21}O_6N$ | 60.88 (61.11) | 6.31 (6.39) | 4.18 (4.30) |
| 12 | $-CH_2(CH_2)_4CH_3$ | H | 198 - 199 | $C_{19}H_{25}O_6N$ | 62.79 (62.58) | 6.93 (6.81) | 3.85 (3.87) |
| 13 |  | H | 250 - 252 | $C_{19}H_{23}O_6N$ | 63.14 (62.88) | 6.42 (6.44) | 3.88 (3.79) |

TABLE 1—Continued

| Example No. | Substituent R1 | Substituent R2 | Melting Point (°C) | Empirical Formula | Elementary Analysis (%) (experimentally determined value in bracket) C | H | N |
|---|---|---|---|---|---|---|---|
| 14 |  | p-CH\<CH₃/CH₃ | 237 - 239 | $C_{22}H_{29}O_6N$ | 65.49 (65.47) | 7.25 (7.30) | 3.47 (3.47) |
| 15 |  | H | 180 - 183 (decomposition) | $C_{20}H_{19}O_6N \cdot 3/2H_2O$ | 60.66 (60.08) | 5.55 (5.15) | 3.53 (3.56) |
| 16 |  | H | 181 - 182 (decomposition) | $C_{20}H_{18}O_6NCl$ | 59.49 (59.21) | 4.49 (4.45) | 3.47 (3.45) |
| 17 |  | H | 234 - 235 | $C_{19}H_{16}O_6NCl$ | 58.55 (58.24) | 4.14 (4.13) | 3.59 (3.32) |
| 18 | -CH₂·CH=CH₂ | p-CH₃ | 218 - 220 | $C_{17}H_{19}O_6N$ | 61.25 (61.19) | 5.75 (5.69) | 4.20 (4.19) |

EXAMPLE 19

4.2 g of N-phenyl-2,4-O-benzylidene-D-glucaro-1-amido-6,3-lactone obtained in above was acetylated at room temperature using 15 ml of acetic anhydride and 7 ml of pyridine, and the acetylation mixture was allowed to stand overnight. The mixture was then poured into 150 ml of ice-water, and the precipitated crystals were recrystallized from methanol to give N-phenyl-5-O-acetyl-2,4-benzylidene-D-glucaro-1-amido-6,3-lactone as colorless plate crystals. Yield, 2.5 g; melting point, 191° – 194°C.

Analysis: Calcd. for $C_{21}H_{19}O_7N$:
C, 63.47; H, 4.82; N, 3.53 (%)
Found: C, 63.58; H, 5.14; N, 3.59 (%)

EXAMPLES 20–57

In the same manner as described in Example 19 the compounds shown in Table 2 below were prepared.

Table 2

| Example No. | R₁ | R₃ | Substituent R₂ | Melting Point (°C) | Empirical Formula | Elementary Analysis (%) (experimentally determined value in bracket) | | |
|---|---|---|---|---|---|---|---|---|
| | | | | | | C | H | N |
| 20 | $-CH_3$ | $-CH_3$ | H | 207 – 209 | $C_{16}H_{17}O_7N$ | 57.31 (57.31) | 5.11 (5.23) | 4.18 (4.31) |
| 21 | $-CH_2-CH=CH_2$ | $-CH_2CH_2COOH$ | H | 157 – 158 | $C_{20}H_{21}O_9N$ | 57.28 (57.46) | 5.05 (5.35) | 3.34 (2.95) |
| 22 | $-CH_2(CH_2)_2CH_3$ | $-CH_3$ | H | 150 | $C_{19}H_{23}O_7N$ | 60.47 (60.56) | 6.14 (6.30) | 3.71 (3.85) |
| 23 | $-CH_2(CH_2)_2CH_3$ | $-CH_3$ | p-$OCH_3$ | 151 – 152 | $C_{20}H_{25}O_8N$ | 58.96 (58.74) | 6.18 (5.98) | 3.44 (3.32) |
| 24 | $-CH_2(CH_2)_2CH_3$ | $-CH_3$ | o-$Cl$ | 174 – 175 | $C_{19}H_{22}O_7NCl$ | 55.41 (55.20) | 5.38 (5.60) | 3.40 (3.56) |
| 25 | $-CH_2(CH_2)_2CH_3$ | $-CH_3$ | 3,4-diethoxy | 211 – 214 | $C_{23}H_{32}O_9N$ | 59.34 (59.64) | 6.71 (6.91) | 3.01 (3.24) |
| 26 | $-CH_2(CH_2)_2CH_3$ | $-CH_2CH_3$ | H | 149 | $C_{20}H_{25}O_7N$ | 61.37 (61.57) | 6.44 (6.64) | 3.58 (3.81) |
| 27 | $-CH_2(CH_2)_2CH_3$ | $-CH_2CH_2CH_3$ | H | 132 – 134 | $C_{21}H_{27}O_7N$ | 62.21 (62.18) | 6.71 (6.54) | 3.46 (3.65) |
| 28 | $-CH_2CH(CH_3)(CH_3)$ | $-CH_3$ | H | 161 | $C_{19}H_{23}O_7N$ | 60.47 (60.85) | 6.14 (6.23) | 3.71 (3.91) |
| 29 | $-CH_2CH_2CH_2OCH_3$ | $-CH_3$ | H | 155 – 156 | $C_{19}H_{23}O_8N$ | 58.01 (58.00) | 5.89 (5.92) | 3.56 (3.64) |

TABLE 2—Continued

| Example No. | R₁ | R₃ | Substituent R₂ | Melting Point (°C) | Empirical Formula | Elementary Analysis (%) (experimentally determined value in bracket) | | |
|---|---|---|---|---|---|---|---|---|
| | | | | | | C | H | N |
| 30 | -CH₂(CH₂)₄CH₃ | -CH₃ | H | 145 - 146 | C₂₁H₂₇O₇N | 62.21 (62.36) | 6.71 (6.78) | 3.46 (3.51) |
| 31 | -CH₂(CH₂)₄CH₃ | -C₆H₅ | H | 137 - 139 | C₂₆H₂₉O₇N | 66.79 (66.74) | 6.25 (6.34) | 3.00 (2.97) |
| 32 | -CH₂(CH₂)₄CH₃ | -C₆H₄-Cl | H | 152 - 154 | C₂₆H₂₈O₇NCl | 62.21 (62.38) | 5.62 (5.58) | 2.79 (2.79) |
| 33 | -C₆H₅ | -CH₃ | H | 193 - 195 | C₂₁H₂₅O₇N | 62.52 (62.25) | 6.25 (6.42) | 3.47 (3.67) |
| 34 | -C₆H₅ | -CH₃ | p-CH(CH₃)₂ | 140 - 142 | C₂₄H₃₁O₇N | 64.70 (64.69) | 7.01 (7.33) | 3.14 (3.28) |
| 35 | -C₆H₅ | -CH₂(CH₂)₇CH₃ | H | 149 | C₂₃H₄₁O₇N | 67.55 (67.59) | 8.02 (7.77) | 2.72 (2.70) |
| 36 | -C₆H₅ | -CH₂CH₂COOH | H | 177 - 179 | C₂₃H₂₇O₉N | 59.86 (59.98) | 5.90 (5.95) | 3.04 (3.07) |
| 37 | -C₆H₅ | -CH₂CH₂COOH | p-OCH₃ | 197 - 199 | C₂₄H₂₉O₁₀N·H₂O | 56.58 (56.74) | 6.13 (5.89) | 2.75 (2.78) |
| 38 | -C₆H₅ | -C₆H₅ | H | 207 - 209 | C₂₆H₂₇O₇N | 67.08 (66.96) | 5.85 (5.84) | 3.01 (2.81) |
| 39 | -C₆H₅ | -C₆H₄-Cl | H | 226 (decomposition) | C₂₆H₂₆O₇NCl | 62.46 (62.14) | 5.24 (5.15) | 2.80 (2.38) |

TABLE 2—Continued

| Example No. | R₁ | R₂ | R₃ | Melting Point (°C) | Empirical Formula | Elementary Analysis (%) (experimentally determined value in bracket) C | H | N |
|---|---|---|---|---|---|---|---|---|
| 40 | -CH₂-⌬ | H | -CH₃ | 200 | $C_{22}H_{21}O_7N$ | 64.22 (64.27) | 5.15 (5.30) | 3.40 (3.54) |
| 41 | -CH₂-⌬ | p-OCH₃ | -CH₃ | 185 - 186 | $C_{23}H_{23}O_8N$ | 62.58 (62.43) | 5.25 (5.21) | 3.17 (3.23) |
| 42 | -CH₂-⌬ | H | -CH₂CH₃ | 165 | $C_{23}H_{23}O_7N$ | 64.93 (64.93) | 5.45 (5.53) | 3.29 (3.34) |
| 43 | -CH₂-⌬ | H | -CH₂CH₂CH₃ | 181 - 182 | $C_{24}H_{25}O_7N$ | 65.59 (65.80) | 5.73 (6.06) | 3.19 (3.29) |
| 44 | -CH₂-⌬ | H | -CH(CH₃)CH₃ | 143 - 145 | $C_{24}H_{25}O_7N$ | 65.59 (65.59) | 5.73 (6.07) | 3.19 (3.23) |
| 45 | -CH₂-⌬ | H | -CH₂(CH₂)₇CH₃ | 141 - 142 | $C_{30}H_{37}O_7N$ | 68.81 (68.86) | 7.12 (6.95) | 2.68 (2.81) |
| 46 | -CH₂-⌬ | H | -⌬-Cl | 187 - 190 | $C_{27}H_{22}O_7NCl$ | 63.85 (63.90) | 4.37 (4.41) | 2.76 (2.77) |
| 47 | -CH₂-⌬-Cl | H | -CH₃ | 228 - 230 | $C_{22}H_{20}O_7NCl$ | 59.27 (59.37) | 4.52 (4.56) | 3.14 (3.28) |
| 48 | -⌬-OCH₃ | H | -CH₃ | 207 - 208 | $C_{22}H_{21}O_8N$ | 61.82 (61.62) | 4.95 (5.14) | 3.28 (3.29) |
| 49 | -⌬-OC₂H₅ | H | -CH₃ | 209 - 212 | $C_{23}H_{23}O_8N$ | 62.58 (62.45) | 5.25 (5.47) | 3.17 (3.32) |

TABLE 2 — Continued

| Example No. | $R_1$ | $R_3$ | Substituent $R_2$ | Melting Point (°C) | Empirical Formula | Elementary Analysis (%) (experimentally determined value in bracket) | | |
|---|---|---|---|---|---|---|---|---|
| | | | | | | C | H | N |
| 50 | (phenyl)-Cl | -CH$_3$ | H | 230 - 231 | C$_{21}$H$_{18}$O$_7$NCl | 58.41 (58.56) | 4.20 (4.28) | 3.24 (3.42) |
| 51 | (phenyl)-Cl | -(benzyl) | H | 217 - 219 | C$_{26}$H$_{20}$O$_7$NCl | 63.23 (63.17) | 4.08 (4.02) | 2.84 (2.93) |
| 52 | -CH$_2$CH=CH$_2$ | -CH$_3$ | H | 166 - 168 | C$_{18}$H$_{19}$O$_7$N | 59.83 (60.04) | 5.30 (5.41) | 3.88 (3.95) |
| 53 | -CH$_2$CH=CH$_2$ | -CH(CH$_3$)$_2$ | H | 149 - 150 | C$_{20}$H$_{23}$O$_7$N | 61.69 (61.46) | 5.95 (5.90) | 3.60 (3.87) |
| 54 | -CH$_2$(CH$_2$)$_2$CH$_3$ | -(phenyl) | H | 155 - 156 | C$_{24}$H$_{25}$O$_7$N | 65.59 (65.56) | 5.73 (5.87) | 3.19 (3.35) |
| 55 | -CH$_2$(CH$_2$)$_2$CH$_3$ | -(phenyl)Cl | H | 183 - 186 | C$_{24}$H$_{24}$O$_7$NCl | 60.83 (60.74) | 5.10 (5.17) | 2.95 (3.07) |
| 56 | (cyclohexyl) | -CH$_3$ | p-OCH$_3$ | 204 - 206 | C$_{22}$H$_{27}$O$_8$N | 60.96 (61.25) | 6.28 (6.10) | 3.23 (3.41) |
| 57 | (o-Cl-phenyl)-CH$_2$- | -CH$_3$ | H | 241 | C$_{22}$H$_{27}$O$_7$NCl | 59.27 (59.60) | 4.52 (4.53) | 3.14 (3.35) |

EXPERIMENT 1

Activity on Acetic Acid — Induced Intraperitoneal Inflammation

Five weak old ddY male mice (five mice per group) were orally administered the test compounds suspended in an aqueous gum arabic at a dosage level of 300 mg/kg of body weight. Thirty minutes after the administration, a 1.2% acetic acid aqueous solution was intraperitoneally injected to the mice at a level of 0.1 ml/10 g of body weight. The mice were sacrificed 3 hours after the acetic acid injection, and immediately subjected to the abdominal section and an intraperitoneal exudate was washed off with 5 ml of a physiological saline solution. The washings were then centrifuged and the serum protein content (concentration) in the supernatant was measured by the Biuret reaction to determine the intraperitoneal transsudate (extravascular) of the serum protein due to the inflammation. The results obtained are shown in Table 3 below.

Table 3

Activity on Acetic Acid – Induced Intraperitoneal Inflammation

| Test Compound | | | Suppression Rate (%) |
|---|---|---|---|
| $R_1$ | $R_2$ | $R_3$ | |
| $-CH_2(CH_2)_2CH_3$ | $-C_6H_5$ | $-CH_3$ | 30.3 |
| $-CH_2(CH_2)_2CH_3$ | $-C_6H_5$ | $-CH_2CH_2CH_3$ | 29.8 |
| $-CH_2(CH_2)_2CH_3$ | $-C_6H_5$ | $-C_6H_5$ | 25.5 |
| $-CH_2(CH_2)_4CH_3$ | $-C_6H_5$ | $-CH_3$ | 27.3 |
| $-C_6H_5$ | $-C_6H_5$ | $-CH_3$ | 30.5 |
| $-C_6H_5$ | $-C_6H_5$ | $-CH_2(CH_2)_7CH_3$ | 46.8 |
| $-C_6H_5$ | $-C_6H_4-OCH_3$ | $-CH_3$ | 32.0 |
| $-C_6H_5$ | $-C_6H_5$ | $-CH_3$ | 33.9 |
| $-C_6H_4-OCH_3$ | $-C_6H_5$ | $-CH_3$ | 35.2 |
| $-CH_2-C_6H_5$ | $-C_6H_5$ | $-CH_3$ | 25.6 |
| $-CH_2-C_6H_5$ | $-C_6H_4-OCH_3$ | $-CH_3$ | 32.0 |
| $-CH_2-C_6H_5$ | $-C_6H_5$ | $-CH_2CH_3$ | 22.0 |
| $-CH_2-C_6H_5$ | $-C_6H_5$ | $-CH(CH_3)_2$ | 26.4 |

EXPERIMENT 2

Activity on Adjuvant Paw Edema

Male rats, Wister-Imamichi, weighing 200 to 250 g (5 rats per group) were subcutaneously administered 0.1 ml per rat of a complete adjuvant (available from Intron Lab., Inc. Tokyo) into the planta of the right paw. When the edema reached its plateau, i.e. about 17 hours after the subcutaneous administration, the following experiment was conducted using the inflamed planta. That is, at the 17th hour after administration of the complete adjuvant, the plantar volume of each of the inflamed raw paw and the normal left paw (control), and the test compound suspended in an aqueous gum arabic solution was then administered orally to the rats at a level of 300 mg per kg of body weight. Thereafter, the plantar volume of the rat paw was determined at intervals indicated in Table below in the same manner as above. The results obtained are shown in Table 4 below.

Table 4

Activity on Adjuvant Paw Edema

| Test Compound | | | Suppression Rate (%) | |
|---|---|---|---|---|
| $R_1$ | $R_2$ | $R_3$ | 2 Hours after administration | 4 Hours after administration |
| $-CH_2(CH_2)_2CH_3$ | $-C_6H_5$ | $-C_6H_4-Cl$ | 28.9 | 24.3 |
| $-CH_2(CH_2)_4CH_3$ | $-C_6H_5$ | $-C_6H_4-Cl$ | 20.1 | 11.3 |
| $-C_6H_{11}$ | $-C_6H_5$ | $-CH_3$ | 20.1 | 12.4 |
| $-C_6H_{11}$ | $-C_6H_4-OCH_3$ | $-CH_3$ | 30.0 | 22.3 |
| $-CH_2CH=CH_2$ | $-C_6H_5$ | $-CH_3$ | 30.6 | 16.5 |
| $-CH_2CH=CH_2$ | $-C_6H_5$ | $-CH(CH_3)_2$ | 20.4 | 14.8 |
| $-C_6H_5$ | $-C_6H_5$ | $-CH_2CH_3$ | 28.3 | 16.1 |
| $-CH_2-C_6H_5$ | $-C_6H_5$ | $-CH(CH_3)_2$ | 14.0 | 12.7 |
| $-CH_2-C_6H_5$ | $-C_6H_5$ | $-CH_2(CH_2)_7CH_3$ | 24.2 | 13.0 |
| $-CH_2-C_6H_5$ | $-C_6H_5$ | $-CH_2CH_3$ | 18.2 | 10.0 |
| $-CH_2-C_6H_5$ | $-C_6H_5$ | $-C_6H_4-Cl$ | 20.0 | 10.5 |

What is claimed is:

1. A process for the preparation of a D-glucarolactone derivative represented by the formula:

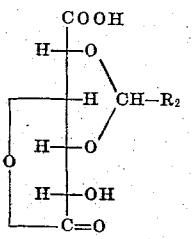

wherein $R_1$ is selected from the group consisting of alkyl having 1–6 carbon atoms, alkoxyalkyl having 2–4 carbon atoms, cyclohexyl, allyl, phenyl, phenyl substituted with chloride or alkoxy having 1–2 carbon atoms as a substituent, benzyl and benzyl substituted with chloride as a substituent; $R_2$ represents phenyl, phenyl substituted with chloride, alkyl having 1–3 carbon atoms or ethoxy or methoxy as a substituent; which comprises the steps of reacting a compound of the formula:

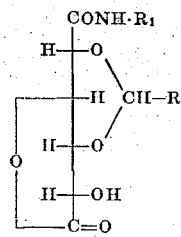

wherein $R_2$ is as defined above, with chloroformic acid ester of the formula

Cl.COOR wherein R represents alkyl having 1–10 carbon atoms, followed by reacting with an amine represented by the formula $R_1NH_2$ wherein $R_1$ is as defined above, in the presence of a condensing agent at a temperature below room temperature.

2. A process according to claim 1, wherein said reaction is carried out in the presence of a solvent selected from the group consisting of dimethylformamide, tetrahydrofuran and chloroform.

3. A process according to claim 1, wherein said reaction is carried out in the presence of a tertiary amine selected from the group consisting of trimethylamine and triethylamine.

4. A process according to claim 1, wherein said reaction is carried out at a temperature ranging from −30° to 5°C.

5. A process according to claim 1, wherein $R_1$ is selected from the group consisting of alkyl having 1–6 carbon atoms, ethoxy ethyl, cyclohexyl, allyl, phenyl, phenyl substituted with chloride, methoxy or ethoxy as a substituent, benzyl and benzyl substituted with chloride as a substituent.

* * * * *

UNITED STATES PATENT OFFICE
CERTIFICATE OF CORRECTION

Patent No. 3,853,917        Dated December 10, 1974

Inventor(s) OKADA et al

It is certified that error appears in the above-identified patent and that said Letters Patent are hereby corrected as shown below:

Column 7, last line should read --O-acetyl-2,4-O-benzylidene-D-glucaro-1-amido-6,3-

Column 18, line 61, "raw" should read --right--

Claim 1, the structural formulas in columns 19 and 20 should be reversed; e.g. the structural formula of column 19 should be in column 20, and the structural formula of column 20 should be in column 19.

Signed and sealed this 18th day of March 1975.

(SEAL)
Attest:

RUTH C. MASON
Attesting Officer

C. MARSHALL DANN
Commissioner of Patents
and Trademarks